3,647,850
FLUORINE SUBSTITUTED BENZYL DITHIO-
CARBAMATES AND THEIR PRODUCTION
AND USE
Hiroshi Ono, Koga-gun, Shiga-ken, and Toshikazu Higuchi, Matsubara-shi, Japan, assignors to Daikin Kogyo Co., Ltd., Osaka-shi, Osaka-fu, Japan
No Drawing. Filed July 26, 1968, Ser. No. 747,836
Claims priority, application Japan, July 26, 1967, 42/47,989
Int. Cl. C07c 155/08
U.S. Cl. 260—455 A          6 Claims

ABSTRACT OF THE DISCLOSURE

Fluorine substituted benzyl dithiocarbamates of the formula:

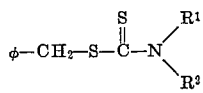

wherein $\phi$ is a fluorophenyl group and $R^1$ and $R^2$ are each a hydrogen atom, an alkyl group having 1 to 4 carbon atoms or an alkenyl group having 3 or 4 carbon atoms, having herbicidal activity against monocotyledonous and dicotyledonous weeds without any material chemical injury on crop plants.

---

The present invention relates to fluorine substituted benzyl dithiocarbamates, and their production and use.

The said fluorine substituted benzyl dithiocarbamates are representable by the formula:

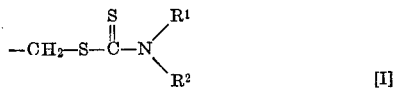

wherein $\phi$ is a fluorophenyl group (i.e. 2-fluorophenyl or 4-fluorophenyl) and $R^1$ and $R^2$ are each a hydrogen atom, an alkyl group having 1 to 4 carbon atoms (e.g. methyl, ethyl, propyl) or an alkenyl group having 3 or 4 carbon atoms (e.g. allyl, crotyl).

It has been found that the fluorine substituted benzyl dithiocarbamates [I] show marked herbicidal activity against monocotyledonous and dicotyledonous weeds without exerting any material chemical injury on crop plants and any substantial toxicity on human beings and aquatic animals, the herbicidal activity being of high intragenous selectivity. It is particularly notable that the herbicidal actvity of the fluorine substituted benzyl dithiocarbamates [I] is much higher than that of the corresponding chlorine substituted benzyl dithiocarbamate, because the previous knowledge suggests the contrary, i.e. the excellency of the chlorinated compound rather than the corresponding fluorinated compound in herbicidal activity [U.S. Pat. 2,992,091]. The present invention is based on the said finding.

Accordingly, a basic object of the present invention is to embody the fluorine substituted benzyl dithiocarbamates [I]. Another object of this invention is to embody the fluorine substituted benzyl dithiocarbamates [I] having herbicidal activity. Another object of the invention is to provide a process for preparing the fluorine substituted benzyl dithiocarbamates [I]. A further object of the invention is to provide a herbicidal composition containing as active ingredients at least one of the fluorine substituted benzyl dithiocarbamates [I]. A still further object of the invention is to embody a method for controlling monocotyledonous and dicotyledonous weeds by exertion of any harmful effect on crop plants. These and other objects will be apparent to those conversant with the art to which the present invention pertains from the subsequent description.

The fluorine substituted benzyl dithiocarbamates [I] are novel and include the following specific compounds: 2-fluorobenzyl dithiocarbamate, 4-fluorobenzyl dithiocarbamate, 2-fluorobenzyl dimethyldithiocarbamate, 4-fluorobenzyl dimethyldithiocarbamate, 2-fluorobenzyl diethyldithiocarbamate, 4-fluorobenzyl diethyldithiocarbamate, 2-fluorobenzyl diisopropyldithiocarbamate, 4-fluorobenzyl diisopropyldithiocarbamate, 2-fluorobenzyl dibutyldithiocarbamate, 4-fluorobenzyl dibutyldithiocarbamate, 2-fluorobenzyl diallyldithiocarbamate, 4-fluorobenzyl diallyldithiocarbamate, etc.

These compounds may be prepared, for instance, by reacting a fluorine substituted benzyl halide of the formula:

wherein X is a halogen atom (e.g. chlorine, bromine) and $\phi$ is as defined above with a metal salt of a dithiocarbamic acid of the formula:

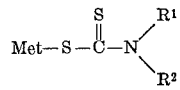

wherein Met is a metal atom (e.g. sodium, potassium) and $R^1$ and $R^2$ are each as defined above in an inert solvent while heating. Further, for instance, the said compounds may be prepared by reacting a fluorine substituted benzyl thiol of the formula:

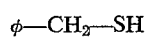

wherein $\phi$ is as defined above with a dithiocarbamyl halide of the formula:

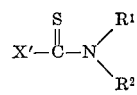

wherein X' is a halogen atom (e.g. chlorine, bromine) and $R^1$ and $R^2$ are each as defined above in an inert solvent in the presence of an acid-eliminating agent (e.g. sodium hydroxide, sodium carbonate, dimethylaniline, triethylamine, pyridine).

The fluorine substituted benzyl dithiocarbamates [I] can be applied in any of composition forms conventionally employed for agricultural medicaments such as dust, granule, wettable powder, emulsion and oil suspension. Such formations may be prepared by extending at least one of the fluorine substituted benzyl dithiocarbamates [I] with an inert carrier(s) so as to retain the active ingredient in an amount sufficient to exert the contemplated activity. Usually from about 1 to 95% by weight of the active ingredient is included in such formulations.

The term "carrier" hereinabove used is intended to mean a material which is employed for carrying the active ingredient to the desired locus. The carrier may be solid or liquid. Examples of the solid carrier are natural clays, kaolin, talc, diatomaceous earth, silica, calcium silicate, calcium carbonate and chemical fertilizers. The liquid carrier may be the one which can dissolve or disperse the active ingredient with or without the aid of an adjuvant(s) and includes, for instance, water, benzene, xylene, kerosine, alcohols, acetone, methylnaphthalene, cyclohexanone, dimethylsulfoxide, dimethylformamide, animal and plant oils, fatty acids and fatty acid esters. As the adjuvant on preparation, there is ordinarily used a surface active agent which may be nonionic (e.g. polyoxyethylene alkyl ether, polyoxyethylene alkyl aryl ether, polyoxyethylene sorbitan monolaurate), cationic (e.g. alkyldimethylbenzeneammonium chloride, alkylpyridazinium chloride), anionic (e.g. alkylbenzenesulfonates, ligninsulfonates, higher alcohol sulfates) or ampholytic (e.g. laurylamine derivatives, alkyldimethylbetainedodecylaminoethylglycine).

When desired, the composition of this invention may include also other herbicidal agents such as pentachlorophenol (PCP), 2,4-dichlorophenoxyacetic acid (2,4-D), 2-methyl-4-chlorophenoxyacetic acid (MCP), 2-methyl-4-chlorophenoxypropionic acid (MCPP), 3-amino-1,2,4-triazole (ATA), 2-chloro-4,6-bis(ethylamino)-symtriazine (Simazin), 2,4-dichlorophenyl 4-nitrophenyl ether, cyanates and sodium chlorate. It may further include conventional fungicides, pesticides, fertilizers, etc.

The fluorine substituted benzyl dithiocarbamates [I] exert remarkable herbicidal activity with high intragenous selectivity. Thus, they markedly inhibit the infestation of annual and perennial, monocotyledonous and dicotyledonous weeds such as smartweed, pigweed, amaranth, common purslane, large crabgrass, barnyard grass, green foxtail, yellow nutsedge and slender spikerush on preemergence treatment and occasionally even on post-emergence treatment, whereas they do not control the growth of crop plants such as rice plant, corn, soybean, peanut, tomato, radish and turf on the said treatments. The intragenous selectivity of rice plant and barnyard grass is particularly notable, and the application to the field of rice plant results in complete inhibition of the emergence and infestation of barnyard without and chemical injury on rice plant such as upland rice and paddy rice. Moreover, their herbicidal activity is of long lasting and found in the soil for a relatively long time, compared with ordinary herbicidal agents.

Some of the tests, of which the results conducted the present invention, are set forth below.

TEST 1.—TEST ON THE HERBICIDAL EFFECT (A) Composition used

The fluorine substituted benzyl dithiocarbamate [I] or the reference compound (25 parts by weight), talc (60 parts by weight), sodium dodecylbenzenesulfonate (10 parts by weight) and sodium ligninsulfonate (5 parts by weight) were mixed well to form a wettable powder composition, which was used in the test.

(B) Test methods (I) Pre-emergence treatment.—Soil was placed in wooden boxes, each being 35 cm. in length, 50 cm. in width and 15 cm. in depth. The seeds of crop plants (i.e. cucumber, tomato, radish, soybean, peanut, upland rice, corn and millet) were sown therein, and covered with soil containing the seeds of annual weeds (i.e. large crabgrass, green foxtail, barnyard grass, yellow nutsedge, smartweed, pigweed, common purslane and amaranth). The 25% wettable powder composition prepared as above was diluted with water and applied to the soil at the rate of 100 g. or 50 g. of the active ingredient per are. The wooden boxes were allowed to stand in a greenhouse at 20 to 25° C. for about 3 weeks. Then, judgement on the herbicidal effect was made.

(II) Post-emergence treatment.—The 25% wettable powder composition as prepared above was diluted with water to make 2,000 p.p.m. or 1,000 p.p.m. and applied on the foliage of the crop plants and weeds sown and cultivated for 2 weeks as described in the above I at the rate of 200 liters of the dilution per 10 are. After 10 days, judgment on the herbicidal effect was made.

(III) Judgment.—The herbicidal effect was indicated by the following indexes:

Effect: Index
  None _____ 0
  Very weak _____ 1
  Weak _____ 2
  Moderate _____ 3
  Strong _____ 4
  Withered _____ 5

(C) The results are shown in Tables 1 and 2

TABLE 1.—PRE-EMERGENCE TREATMENT

| | | Active ingredient | | | | | | | | | | | | | | |
|---|---|---|---|---|---|---|---|---|---|---|---|---|---|---|---|---|
| | | (1) | | (2) | | (3) | | (4) | | (5) | | (6) | | (a) | | (b) |
| | | Dose (g./a.) | | | | | | | | | | | | | | |
| | | 100 | 50 | 100 | 50 | 100 | 50 | 100 | 50 | 100 | 50 | 100 | 50 | 100 | 50 | 100 | 50 |
| Dicotyledonous weed | Tomato | 3 | 0 | 2 | 0 | 0 | 0 | 3 | 1 | 2 | 0 | 0 | 0 | 0 | 0 | 3 | 1 |
| | Radish | 0 | 0 | 0 | 0 | 0 | 0 | 1 | 0 | 0 | 0 | 0 | 0 | 1 | 0 | 3 | 0 |
| | Soybean | 0 | 0 | 0 | 0 | 0 | 0 | 1 | 0 | 0 | 0 | 0 | 0 | 0 | 0 | 2 | 0 |
| | Peanut | 0 | 0 | 0 | 0 | 0 | 0 | 0 | 0 | 0 | 0 | 0 | 0 | 0 | 0 | 0 | 0 |
| | Cucumber | 3 | 1 | 2 | 0 | 0 | 0 | 3 | 2 | 2 | 0 | 0 | 0 | 0 | 0 | 2 | 0 |
| | Pigweed | 5 | 5 | 5 | 5 | 5 | 3 | 5 | 5 | 4 | 3 | 4 | 2 | 2 | 2 | 1 | 0 |
| | Common purslane | 5 | 5 | 5 | 5 | 5 | 3 | 5 | 5 | 5 | 3 | 5 | 3 | 0 | 0 | 3 | 3 |
| | Amaranth | 5 | 5 | 5 | 5 | 5 | 5 | 5 | 5 | 4 | 2 | 5 | 5 | 4 | 2 | 3 | 0 |
| | Smartweed | 5 | 5 | 5 | 5 | 3 | 1 | 5 | 5 | 4 | 3 | 3 | 1 | 3 | 0 | 2 | 0 |
| Monocotyledonous weed | Upland rice | 0 | 0 | 0 | 0 | 0 | 0 | 2 | 0 | 0 | 0 | 0 | 0 | 3 | 1 | 3 | 2 |
| | Corn | 2 | 0 | 0 | 0 | 0 | 0 | 2 | 1 | 0 | 0 | 0 | 0 | 2 | 0 | 1 | 1 |
| | Millet | 4 | 2 | 5 | 3 | 2 | 0 | 5 | 4 | 3 | 0 | 0 | 0 | 1 | 0 | 4 | 1 |
| | Large crabgrass | 5 | 5 | 5 | 5 | 5 | 5 | 5 | 5 | 5 | 5 | 5 | 2 | 5 | 5 | 5 | 5 |
| | Green foxtail | 5 | 5 | 5 | 5 | 5 | 5 | 5 | 5 | 4 | 2 | 4 | 3 | 3 | 1 | 3 | 2 |
| | Barnyard grass | 5 | 5 | 5 | 5 | 5 | 5 | 5 | 5 | 4 | 2 | 5 | 5 | 2 | 1 | 5 | 4 |
| | Yellow nutsedge | 5 | 5 | 5 | 5 | 5 | 4 | 5 | 5 | 4 | 3 | 5 | 4 | 0 | 0 | 2 | 0 |

NOTE.—The active ingredients used are as follows: (1) 4-fluorobenzyl diisopropyldithiocarbamate; (2) 2-fluorobenzyl diisopropyldithiocarbamate; (3) 4-fluorobenzyl diethyldithiocarbamate; (4) 4-fluorobenzyl diallyldithiocarbamate; (5) 2-fluorobenzyl dibutyldithiocarbamate; (6) 2-fluorobenzyl dimethyldithiocarbamate; (a) 2,6-dichlorobenzyl diisopropyldithiocarbamate; (b) ar,ar,ar-trichlorobenzyl diisopropyldithiocarbamate. The compounds (1) to (6) are of this invention and the compounds (a) and (b) are known herbicidal agents.

TABLE 2.—(POST-EMERGENCE TREATMENT)

| | | Active ingredient | | | | | | | | | | | | | | |
|---|---|---|---|---|---|---|---|---|---|---|---|---|---|---|---|---|
| | | (1) | | (2) | | (3) | | (4) | | (5) | | (6) | | (a) | | (b) |
| | | Dose (p.p.m.) | | | | | | | | | | | | | | |
| | | 2,000 | 1,000 | 2,000 | 1,000 | 2,000 | 1,000 | 2,000 | 1,000 | 2,000 | 1,000 | 2,000 | 1,000 | 2,000 | 1,000 |
| Dicotyledonous weed. | Tomato | 0 | 0 | 2 | 0 | 0 | 0 | 2 | 0 | 0 | 0 | 0 | 0 | 3 | 0 | 5 | 3 |
| | Radish | 0 | 0 | 0 | 0 | 0 | 0 | 2 | 0 | 0 | 0 | 0 | 0 | 2 | 1 | 3 | 2 |
| | Soybean | 2 | 0 | 0 | 0 | 0 | 0 | 0 | 0 | 0 | 0 | 0 | 0 | 1 | 0 | 2 | 1 |
| | Peanut | 2 | 0 | 0 | 0 | 0 | 0 | 0 | 0 | 0 | 0 | 0 | 0 | 0 | 0 | 2 | 0 |
| | Cucumber | 5 | 5 | 4 | 3 | 0 | 0 | 4 | 2 | 2 | 0 | 3 | 0 | 1 | 0 | 3 | 1 |
| | Pigweed | 5 | 5 | 5 | 5 | 4 | 3 | 5 | 3 | 4 | 2 | 4 | 4 | 2 | 0 | 4 | 3 |
| | Common purslane | 5 | 4 | 5 | 5 | 5 | 3 | 5 | 4 | 4 | 1 | 5 | 5 | 0 | 0 | 3 | 1 |
| | Amaranth | 4 | 2 | 5 | 3 | 5 | 3 | 5 | 3 | 5 | 3 | 5 | 5 | 0 | 0 | 5 | 3 |
| | Smartweed | 3 | 0 | 4 | 4 | 3 | 1 | 4 | 2 | 3 | 1 | 3 | 1 | 2 | 0 | 4 | 1 |
| Monocotyledonous weed. | Upland rice | 0 | 0 | 0 | 0 | 0 | 0 | 0 | 0 | 0 | 0 | 0 | 0 | 1 | 0 | 1 | 1 |
| | Corn | 3 | 0 | 0 | 0 | 0 | 0 | 3 | 1 | 1 | 0 | 0 | 0 | 0 | 0 | 1 | 0 |
| | Millet | 3 | 0 | 3 | 0 | 0 | 0 | 5 | 3 | 2 | 0 | 0 | 0 | 0 | 0 | 1 | 0 |
| | Large crabgrass | 5 | 5 | 5 | 5 | 5 | 2 | 5 | 5 | 5 | 5 | 3 | 1 | 3 | 2 | 3 | 3 |
| | Green foxtail | 5 | 4 | 5 | 5 | 4 | 2 | 5 | 5 | 5 | 5 | 5 | 2 | 2 | 0 | 2 | 0 |
| | Barnyard grass | 5 | 5 | 5 | 4 | 4 | 3 | 5 | 5 | 5 | 5 | 5 | 4 | 0 | 0 | 1 | 1 |
| | Yellow nutsedge | 5 | 5 | 5 | 5 | 4 | 3 | 5 | 5 | 5 | 5 | 5 | 5 | 3 | 1 | 3 | 3 |

NOTE.—As to the active ingredients, see the note below Table 1.

From the above tables, it is seen that the herbicidal potency of the compounds (1) to (6) of this invention is higher than that of the reference compounds (a) and (b). The compounds of this invention are excellent in the selectivity between the crop plants and the weeds. The selectivity between upland rice and the weeds when applied to soil prior to the emergence is particularly notable.

TEST 2

Test on the intragenous selectivity between paddy rice and barnyard grass in herbicidal activity.

(A) Composition used

Same as in the test 1.

(B) Test method

The test was carried out using resin-made pots of 16 cm. in diameter and 15 cm. in depth with 20 seeds of paddy rice and 20 seeds of barnyard grass per pot. The 25% wettable powder composition prepared as in the test 1 was diluted with water to make 2,000 p.p.m. and the dilution was applied at the rate of 100 g. or 50 g. of the active ingredient per are. The treatment was made by either one of the following procedures: (a) charging the pot with soil, placing the seeds on the soil, covering the seeds with soil, applying a designed amount of the test composition and watering; and (b) charging the pot with soil, applying a designed amount of the test composition on the soil, placing the seeds thereon, covering the seeds with soil and watering. After the treatment, the pots were allowed to stand in a greenhouse at 20 to 25° C. for 30 days. Then, the plants were taken off, washed with water and subjected to measurement of the stem length and the root length.

(C) The results are shown in Table 3.

TABLE 3

| Active ingredient | Treatment procedure | Dose (g./a.) | Barnyard grass Stem length (c.m.) | Barnyard grass Root length (c.m.) | Paddy rice Stem length (c.m.) | Paddy rice Root length (c.m.) |
|---|---|---|---|---|---|---|
| (1) | a | 100 | 0 | 0 | 14.0 | 12.6 |
| | | 50 | 0 | 0 | 13.8 | 13.6 |
| | b | 100 | 0 | 0 | 14.0 | 14.1 |
| | | 50 | 2.1 | 5.8 | 13.5 | 14.3 |
| (b) | a | 100 | 0 | 0 | 7.3 | 9.8 |
| | | 50 | 3.5 | 8.4 | 10.2 | 12.1 |
| | b | 100 | 5.6 | 6.5 | 10.8 | 10.5 |
| | | 50 | 10.2 | 13.8 | 11.6 | 13.0 |
| Control | | | 15.3 | 16.4 | 14.4 | 11.6 |

NOTE.—As to the active ingredients, see the note below Table 1.

From the above table, it is seen that the compound (1) of this invention exerts strong herbicidal activity against barnyard grass without any chemical injury on paddy rice when applied prior to emergence, whereas the reference compound (b) shows inferior herbicidal activity on the weed with considerable chemical injury on not only the stem but also the root of the crop plant. Thus, the compound of this invention is excellent in intragenous selectivity.

TEST 3

Test on the herbicidal activity in paddy rice transplanting cultivation.

(A) Composition used

Same as in the test 1.

(B) Test method

Resin-made pots of 16 cm. in diameter and 15 cm. in depth were charged with soil. The seeds of barnyard grass, sedge, pickerelweed, false pimpernel, toothcup and chickweed and the roots of slender spikerush were placed 5 cm. below the surface. After watering, paddy rice of 4 leaf stage was transplanted. On the 4th day from the transplanting, the 25% wettable powder composition prepared as in the test 1 was diluted with water to make 1,000 p.p.m. and the dilution was applied at the rate of 10 g., 20 g. or 40 g. of the active ingredient per are on the water surface. After 30 days, the weeds were taken off and weighed. The weight percent of the weeds in the treated plot to those in the untreated plot was determined as well as the extent of the chemical injury.

(C) Results

The results are shown in Table 4.

TABLE 4

| Active ingredient | Dose (g./a.) | Weight percent of— Monocotyledonous weeds | Weight percent of— Slender spikerush | Weight percent of— Dicotyledonous weeds | Chemical injury to paddy rice |
|---|---|---|---|---|---|
| (2) | 10 | 13.7 | 28 | 18.5 | None. |
| | 20 | 5.0 | 17.5 | 15.0 | |
| | 40 | 0 | 0 | 8.0 | |
| (b) | 10 | 82.4 | 100 | 57.2 | None. |
| | 40 | 15.8 | 78.2 | 18.3 | (¹). |
| (c) | 40 | 18.4 | 41.2 | 10.5 | None. |

¹ Injury found in height of grass and number of stem.

NOTE.—The active ingredient (c) is 3,4-dichloro-propionanilide known as a herbicidal agent. As to the other active ingredients, see the note below Table 1.

From the above table, it is seen that the compound (2) of this invention is superior to the known herbicidal agent (c) in herbicidal action.

TEST 4

Test on the herbicidal effect in upland rice cultivation.

The 25% wettable powder composition of 2-fluorobenzyl diethyldithiocarbamate or 2-fluorobenzyl dipropyldithiocarbamate prepared as in the test 1 was diluted with 10 liters of water and applied at the rate of 30 g. of the active ingredient per are to the field where the seeds of upland rice had been sown 5 days before. No growth of weeds was seen in this treated plot, whereas various weeds such as large crabgrass, green foxtail and smartweed were grown in the adjacent untreated plot. In addition, no difference was seen on the yield of the crop between the treated plot and the untreated but hand weeded plot.

TEST 5

Test on the herbicidal effect in corn cultivation.

The 25% wettable powder composition of 2-fluorobenzyl diethyldithiocarbamate or 2-fluorobenzyl dipropyldithiocarbamate prepared as in the test 1 was diluted with 10 liters of water and applied to a field at the rate of 40 g. of the active ingredient per are, followed by soil incorporation. Then, the seeds of corn are sown and covered with soil. No growth of weeds was seen in this treated plot, whereas various weeds such as large crabgrass, green foxtail and smartweed were grown in the adjacent untreated plot. In addition, no difference was seen on the yield of the crop between the treated plot and the untreated but hand weeded plot.

TEST 6

Test on the herbicidal effect in soybean cultivation.

The 25% wettable powder composition of 2-fluorobenzyl diethyldithiocarbamate, 4-fluorobenzyl dipropyldithiocarbamate or 2-chloro-4,6-bis(ethylamino)-1,3,5-triazine prepared as in the test 1 was diluted with 10 liters of water and applied at the rate of 30 g. of the active ingredient (10 g. in the case of the last one) per are to the field where the seeds of soybean had been sown 5 days before. The weeds infested in the adjacent untreated plot were large crabgrass, green foxtail, smartweed, etc. The results 3 weeks after the application as shown in Table 5 where the percentage of survived weeds and the percentage of yield are respectively calculated on the basis of the amount of survived weeds in the untreated plot being as 100 and of the yield in the hand weeded plot being as 100.

TABLE 5

| Active ingredient | Dose (g./a.) | Percentage of survived weeds (percent) | | | Yield of soybean (percent) |
| --- | --- | --- | --- | --- | --- |
| | | Monocotyledonous | Dicotyledonous | Total | |
| 2-fluorobenzyl diethyldithiocarbamate | 30 | 2.1 | 15.3 | 6.5 | 102 |
| 4-fluorobenzyl dipropyldithiocarbamate | 30 | 5.6 | 10.3 | 7.2 | 100 |
| 2-chloro-4,6-bis(ethylamino)-1,3,5-triazine | 10 | 10.2 | 15.2 | 11.9 | 98.5 |
| Untreated plot | | 100 | 100 | 100 | 78.2 |
| Hand weeded plot | | 0 | 0 | 0 | 100 |

From the above table, it is presumed that the chemical injury of the compounds of this invention on soybean are less than that of the known herbicidal agent.

TEST 7

Test on the herbicidal effect in wheat cultivation.

The 25% wettable powder composition of 2-fluorobenzyl diethyldithiocarbamate, 4-fluorobenzyl dipropyldithiocarbamate or isopropyl N-(3-chlorophenyl)carbamate prepared as in the test 1 was diluted with 10 liters of water and applied at the rate of 30 g. of the active ingredient to the field where the seeds of wheat had been sown one day before. The weeds infested in the adjacent untreaded plot were dent foxtail, annual bluegrass, chickweed, bittercress, etc. The results 3 weeks after the application are shown in Table 6 where the percentage of survived weeds and the percentage of yield are indicated as in the test 6.

TABLE 6

| Active ingredient | Dose (g./a.) | Percentage of survived weeds (percent) | | | Yield of wheat (percent) |
| --- | --- | --- | --- | --- | --- |
| | | Monocotyledonous | Dicotyledonous | Total | |
| 2-fluorobenzyl diethyldithiocarbamate | 30 | 2.1 | 10.5 | 6.3 | 108.3 |
| 4-fluorobenzyl dipropyldithiocarbamate | 30 | 15.2 | 8.8 | 12.5 | 100.5 |
| Isopropyl N-(3-chlorophenyl)-carbamate | 30 | 14.3 | 31.2 | 17.8 | 99.3 |
| Untreated plot | | 100 | 100 | 100 | 86.3 |
| Hand weeded plot | | 0 | 0 | 0 | 100 |

From the above table, it is seen that the compounds of this invention are superior to the known herbicidal agent in herbicidal action and lesser than the latter in chemical injury.

TEST 8

Test on the herbicidal effect in turf cultivation.

When weeds such as large crabgrass and yellow nutsedge were grown in spring in established turf and reached to one leaf stage, the 25% wettable powder composition of 4-fluorobenzyl dimethyldithiocarbamate prepared as in the test 1 was diluted with 10 liters of water and applied thereto at the rate of 40 g. of the active ingredient per are. The weeds became withered within 1 week, and no growth was seen for about 2 months thereafter. The turf received no chemical injury and was grown normally.

The herbicidal composition of the present invention is suitable, depending on the concentration of the active ingredient therein for the selective destruction of weeds under crop plants and also for the total killing and destruction of undesired plant growth. Thus, the herbicidal method of this invention comprises applying the active ingredient, ordinarily in a herbicidal preparation of the aforementioned type, to the locus or areas to be protected from undesirable plant growth. The active ingredient is, of course, applied in amount sufficient to exert the desired herbicidal action. The application can be made directly upon the locus or area and the vegetation thereon during the period of infestation. Preferably, however, the active ingredient is applied directly to the soil prior to weed infestation, i.e. as a pre-emergence treatment, or at the primary stage of weed infestation. In such treatment, the use of 20 to 40 g. of this active ingredient per are is normally sufficient to expect the desired herbicidal effect.

Practical and presently-preferred embodiments of the present invention are illustratively shown in the following examples.

Part A.—Preparation procedure of the compound of this invention.

EXAMPLE 1

In a 300 ml. flask, there are admitted 40% aqueous solution of dimethylamine (11.2 g.) and 20% aqueous solution of sodium hydroxide (4 g.), and the resultant mixture is kept at 15 to 20° C. Carbon disulfide (7.6 g.) is dropwise added thereto. After 1 hours, water (100 ml.) and 4-fluorobenzyl chloride (11.6 g.) are continuously added to the resulting mixture, and stirring is continued at 60° C. for 4 hours. The reaction mixture is allowed to cool so that the organic phase is solidified. The crystals are collected by filtration, washed with water and dried to give 4-fluorobenzyl dimethyldithiocarbamate (17.0 g.) as gray crystals. Yield, 93%. M.P., 57 to 58° C. Elementary analysis for fluorine: Found, 8.21%; Calcd., 83.%.

EXAMPLE 2

In a 300 ml. flask, there are admitted 10% aqueous solution of diethylamine (7.3 g.) and 10% aqueous solution of sodium hydroxide (4 g.), and the resultant mixture is kept at 15 to 20° C. Carbon disulfide (7.6 g.) is dropwise added thereto. After 1 hour, water (100 ml.) and 4-fluorobenzyl chloride (11.6 g.) are continuously added to the resulting mixture, and stirring is continued at 60° C. for 4 hours. The organic phase is extracted with ether. The extract is washed with water, dried and concentrated to give 4-fluorobenzyl diethyldithiocarbamate (16.0 g.) as yellowish brown liquid. $n_D^{23.5}$ 1.5970. Elementary analysis for fluorine: Found, 7.14%; Calcd., 7.40%.

EXAMPLE 3

The reaction is carried out as in Example 2 using dipropylamine (10.1 g.) in place of diethylamine (7.3 g.) to give 4-fluorobenzyl dipropyldithiocarbamate (21.9 g.) as pale yellow oil. $n_D^{23.5}$ 1.5792. Elementary analysis for fluorine: Found, 6.72%; Calcd., 6.69%.

EXAMPLE 4

The reaction is carried out as in Example 2 using diisopropylamine (10.1 g.) in place of diethylamine (7.3 g.) to give 4-fluorobenzyl diisopropyldithiocarbamate (17.5 g.) as pale yellow oil. $n_D^{23.5}$ 1.5811. Elementary analysis for fluorine: Found, 6.56%; Calcd. 6.68%.

EXAMPLE 5

In a 300 ml. flask, there are admitted 10% aqueous solution of diisopropylamine (10.1 g.) and aqueous solution of sodium hydroxide (4.0 g.), and the resultant mixture is kept at 10 to 15° C. Carbon disulfide (7.6 g.) is dropwise added thereto. The obtained pale yellow crystals are dissolved in water (100 ml.), and 2-fluorobenzyl chloride (11.6 g.) is added to the resulting mixture. After heating at 60° C. for 4 hours, the organic phase is extracted with ether. The extract is washed with water, dried and treated with active carbon. By removal of the ether, 2-fluorobenzyl diisopropyldithiocarbamate (18.8 g.) is obtained as pale yelllow oil. $n_D^{23.5}$ 1.5853. Elementary analysis for fluorine: Found, 6.03%; Calcd., 6.68%.

EXAMPLE 6

The reaction is carried out as in Example 5 using dibutylamine (12.9 g.) in place of diisopropylamine (10.1 g.) to give 2-fluorobenzyl dibutyldithiocarbamate (19.0 g.) as blackish yellow oil. $n_D^{29}$ 1.5664. Elementary analysis for fluorine: Found, 6.11%; Calcd., 6.08%.

EXAMPLE 7

The reaction is carried out as in Example 5 using diallylamine (9.7 g.) in place of diisopropylamine (10.1 g. ) to give 2-fluorobenzyl diallyldithiocarbamate (17.0 g.) as pale yellow oil. $n_D^{29}$ 1.6028. Elementary analysis for fluorine: Found, 6.57%; Calcd., 6.78%.

Part B.—Herbicidal composition comprising as an active ingredient the compound of this invention.

EXAMPLE 1

4-fluorobenzyl diisopropyldithiocarbamate (50 parts by weight), clay (35 parts by weight), sodium laurylsulfate (10 parts by weight) and polyvinyl alcohol (5 parts by weight) are mixed and crushed well to form a wettable powder composition.

The composition is extended with water to make a sprayable mixture containing 0.1% by weight of the active ingredient and sprayed at the rate of 30 grams of the active ingredient per are on the field of upland rice prior to the emergence of weeds. This treatment shows a high control effect against monocotyledonous and dicotyledonous weeds without exerting any chemical injury on upland rice.

EXAMPLE 2

2-fluorobenzyl diisopropyldithiocarbamate (20 parts by weight), bentonite (25 parts by weight), clay (40 parts by weight), soap (10 parts by weight) and sodium ligninsulfonate (5 parts by weight) are mixed, and a proper amount of water is added thereto. The resulting mixture is kneaded homogeneously and granulated to form a granule composition.

The composition is scattered as such by hand at the rate of 30 grams of the active ingredient per are on the field of upland rice prior to the emergence of weeds. This treatment shows a high control effect against monocotyledonous and dicotyledonous weeds without exerting any chemical injury on upland rice.

EXAMPLE 3

2-fluorobenzyl diallyldithiocarbamate (35 parts by weight), isophorone (15 parts by weight), methyl naphtha (40 parts by weight) and a dodecylbenzenesulfonic acid-polyglycol system emulsifier (10 parts by weight) are mixed well to form an emulsifiable composition.

The composition is diluted with water to make an emulsion containing 0.1% by weight of the active ingredient and sprayed at the rate of 30 grams of the active ingredient per are on the field of upland rice prior to the emergence of weeds. This treatment shows a high control effect against monocotyledonous and dicotyledonous weeds without exerting any chemical injury on upland rice.

What is claimed is:

1. A fluorine substituted benzyl dithiocarbamate of the formula:

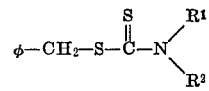

wherein $\phi$ is a 2 or 4 fluorophenyl group and each of $R^1$ and $R^2$ is an alkyl group of 1 to 4 carbon atoms.

2. The fluorine substituted benzyl dithiocarbamate according to claim 1, in which both of $R^1$ and $R^2$ are the same alkyl group.

3. The fluorine substituted benzyl dithiocarbamate according to claim 1, in which $\phi$ is 2-fluorophenyl and $R^1$ and $R^2$ are each isopropyl.

4. The fluorine substituted benzyl dithiocarbamate according to claim 1, in which $\phi$ is 4-fluorophenyl and $R^1$ and $R^2$ are each isopropyl.

5. The fluorine substituted benzyl dithiocarbamate according to claim 1, in which $\phi$ is 4-fluorophenyl and $R^1$ and $R^2$ are each ethyl.

6. The fluorine substituted benzyl dithiocarbamate according to claim 1, in which $\phi$ is 4-fluorophenyl and $R^1$ and $R^2$ are each propyl.

References Cited

UNITED STATES PATENTS

| | | | |
|---|---|---|---|
| 2,941,879 | 6/1960 | Goodhue | 260—455 |
| 2,992,091 | 7/1961 | Harman et al. | 71—101 |
| 3,152,163 | 10/1964 | Zerbe et al. | 260—455 |
| 3,352,815 | 11/1967 | Bencze | 260—455 |
| 3,510,503 | 5/1970 | Brokke et al. | 260—455 |

FOREIGN PATENTS

| | | | |
|---|---|---|---|
| 23,269 | 11/1967 | Japan | 71—101 |
| 633,277 | 12/1963 | Belgium | 260—455 |
| 692,638 | 8/1964 | Canada | 71—101 |
| 805,500 | 12/1958 | Great Britain | 260—455 |

OTHER REFERENCES

Jerumanis et al.: "Spectrographic Methods for the Detection of Active Methylene Groups Etc." (1960), CA 56, pp. 5859–60 (1962).

LEWIS GOTTS, Primary Examiner

G. HOLLRAH, Assistant Examiner

U.S. Cl. X.R.

71—83, 92, 93, 101